March 30, 1965  O. J. WINKELMANN  3,175,636
CURVED PROPELLER SHAFT ROTATABLY SUPPORTED IN A PLASTIC SHEATH
Filed Oct. 26, 1959  3 Sheets-Sheet 1
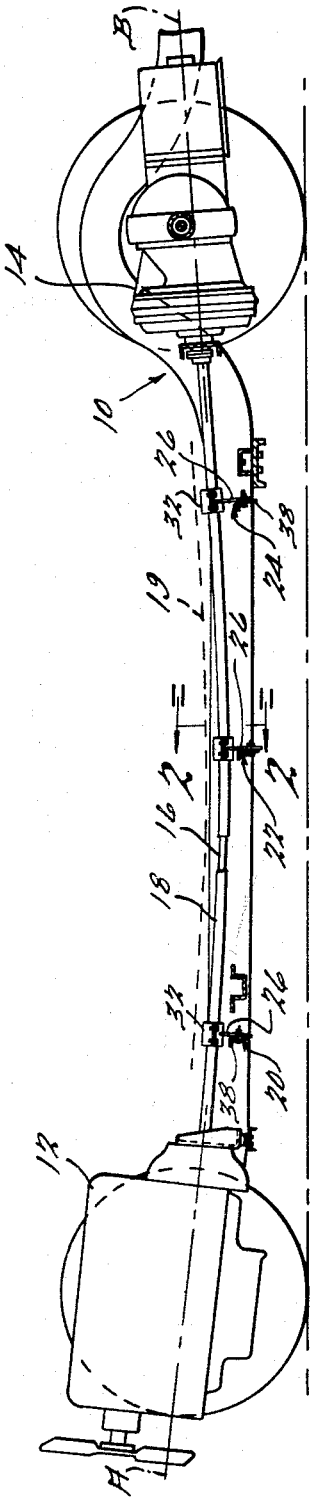
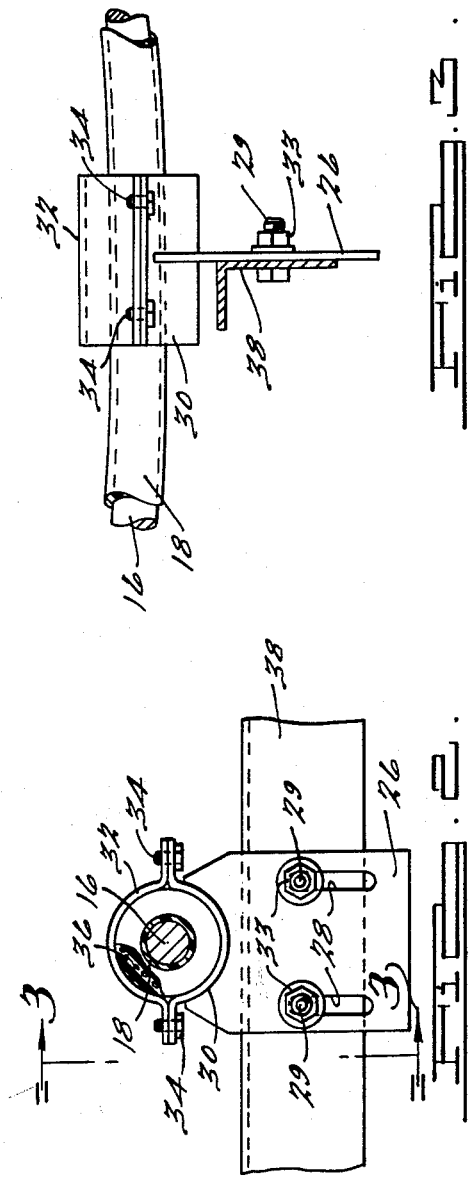
INVENTOR.
Otto J. Winkelmann
BY
Harness and Harris
ATTORNEYS.

March 30, 1965     O. J. WINKELMANN     3,175,636
CURVED PROPELLER SHAFT ROTATABLY SUPPORTED IN A PLASTIC SHEATH
Filed Oct. 26, 1959     3 Sheets-Sheet 2
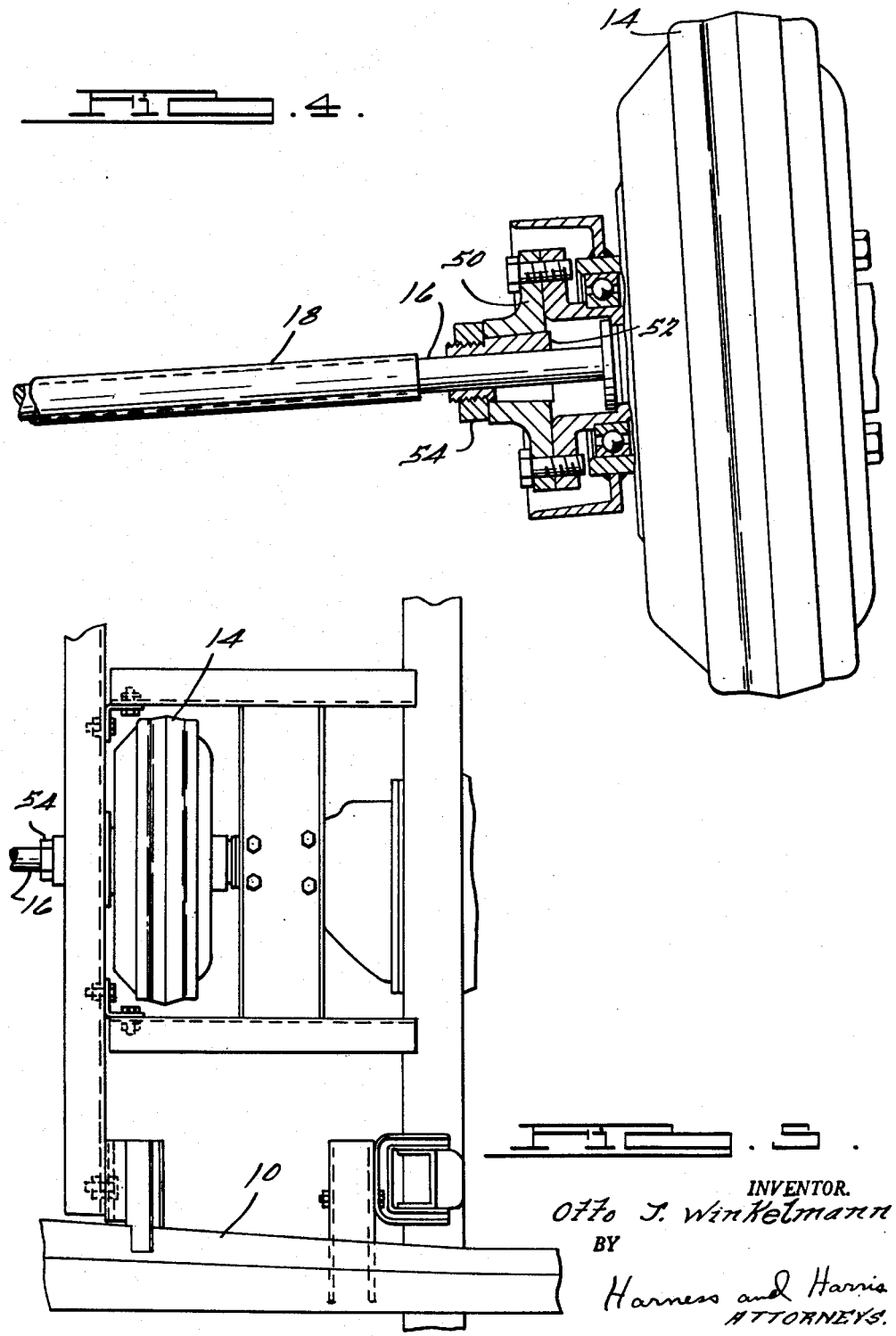
INVENTOR.
Otto J. Winkelmann
BY
Harness and Harris
ATTORNEYS.

March 30, 1965     O. J. WINKELMANN     3,175,636
CURVED PROPELLER SHAFT ROTATABLY SUPPORTED IN A PLASTIC SHEATH
Filed Oct. 26, 1959     3 Sheets-Sheet 3
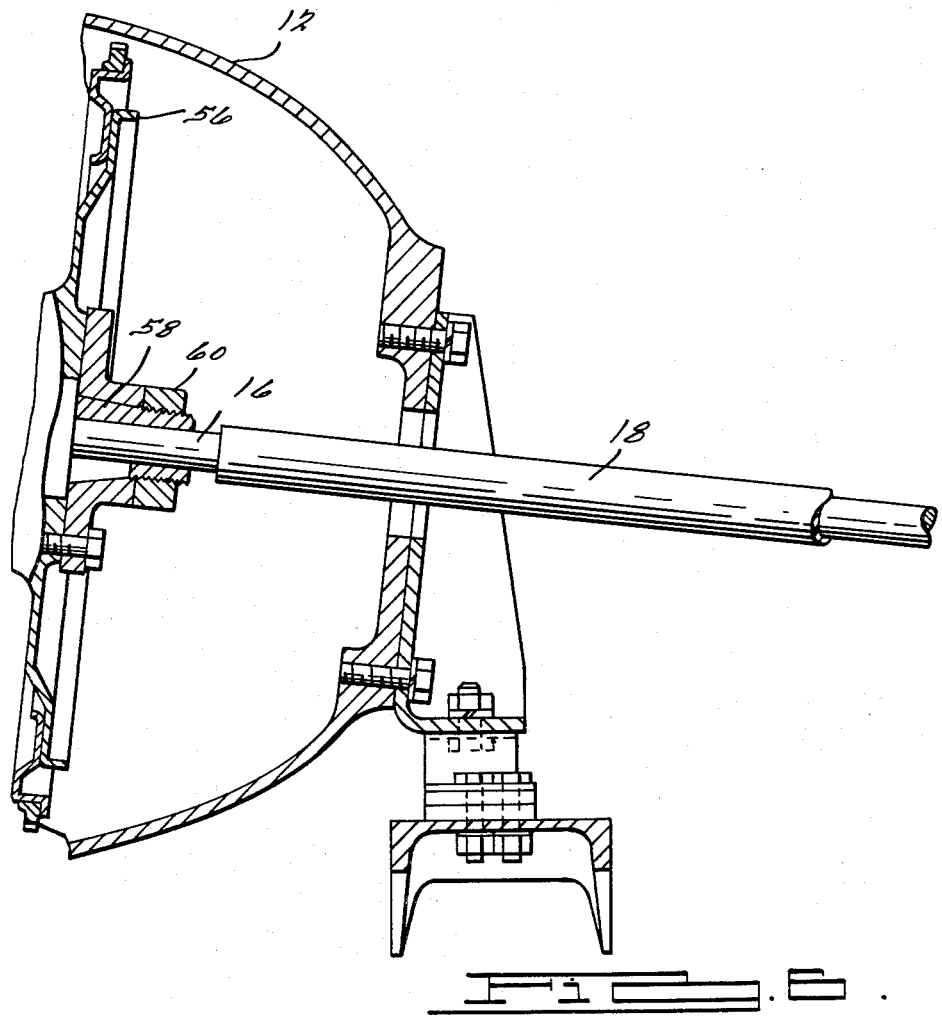
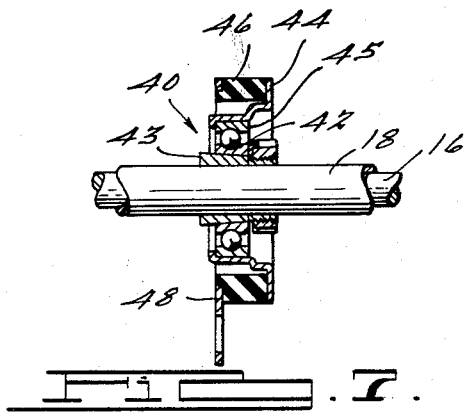
INVENTOR.
Otto J. Winkelmann
BY
Harness and Harris
ATTORNEYS.

United States Patent Office 3,175,636
Patented Mar. 30, 1965

3,175,636
CURVED PROPELLER SHAFT ROTATABLY SUPPORTED IN A PLASTIC SHEATH
Otto J. Winkelmann, Birmingham, Mich., assignor to Chrysler Corporation, Highland Park, Mich., a corporation of Delaware
Filed Oct. 26, 1959, Ser. No. 848,742
1 Claim. (Cl. 180—70)

This invention relates to power transmitting propeller shafts, and in particular concerns a single-piece flexible propeller shaft for transmitting power from the tilted engine of a vehicle to the tilted rear axle-differential unit thereof.

Conventional propeller shafts used to transmit power from an engine to a driven element such as a differential or a "traxle" (combination transmission and differential) usually consist either of a single tube or a section pipe that runs in a raised tunnel and has universal joints at its ends, or two or more tube or pipe sections having universal type joints at each end of the several sections with an intermediate bearing supporting the universal joint that connects the adjacent ends of the shaft sections. This type of propeller shaft structure necessarily is costly, both as to material and installation. Moreover, the universal joints normally used are not of the uniform angular velocity type, and therefore they often create vibration problems which require additional and expensive vibration damping structure for mounting the propeller shaft.

The present invention eliminates the foregoing power transmission problems by utilizing a single-piece flexible steel shaft or other strong flexible material shaft, which is axially connected at one end to the output end of the engine on a line corresponding to the axis of the engine's power output and is connected at its other end to the differential or "traxle" unit along the line of power input thereto. Since the engine and the differential or "traxle" unit are each dipped slightly downwardly toward each other, the flexible propeller shaft is slightly bowed downwardly so that its ends will be coaxial with the engine output shaft and the differential or "traxle" unit input shaft. Rotation of the propeller shaft does not cause significant whipping motion of the shaft because of its flexibility and its manner of support between the driving and driven units. The special supports that have been devised will be described in detail below.

The advantages of applicant's novel propeller shaft can be particularly utilized in motor vehicle drive train design. Applicant's shaft allows the elimination of the propeller shaft tunnel normally present in the floor of current automotive vehicles due to the fact that applicant's flexible shaft bows downwardly out of the way of the floor and furthermore, the shaft itself is small in diameter to thereby occupy a minimum space underneath the vehicle.

The preferred embodiment of the invention utilizes a "traxle"-type transmission of the type shown for example in Patent No. 1,238,927 wherein the transmission and the differential gearing are each located at the output end of the propeller shaft so that a minimum of torque is applied to the propeller shaft in driving the vehicle wheels. Such a "traxle" unit can be mounted on a vehicle frame as shown in Lee Patent No. 2,112,628 that shows a so-called "sprung differential." In this manner the flexible propeller shaft need only transmit engine torque and can be kept to a small diameter so that its advantages as to size over the conventional propeller shaft are maximized while at the same time flexibility of the shaft is increased so that bowing of the shaft may be more readily achieved.

A principal object of this invention is to provide a flexible single-piece propeller shaft for transmitting power from the engine of an automotive vehicle to the differential unit thereof designed to eliminate shaft universal joints, expensive intermediate bearing assemblies, and propeller shaft vibration damping mechanism.

It is another object of this invention to provide a reduced cost propeller shaft installation that eliminates troublesome shaft vibration disturbances.

A further object is to provide a power transmitting means which will increase the space available for occupancy within the vehicle.

Further objects and advantages of the present invention will become apparent from the following description and drawings, in which:

FIGURE 1 represents a longitudinal cross-sectional view of an automotive vehicle showing the flexible propeller shaft connecting the engine with a "traxle" transmission unit;

FIGURE 2 represents a cross-sectional view of FIGURE 1 taken along the line 2—2 thereof in the direction of the arrows;

FIGURE 3 represents a view of FIGURE 2 taken along the line 3—3 thereof in the direction of the arrows;

FIGURE 4 represents an enlarged partially cross-sectional view of a portion of FIGURE 1, showing the interconnection of the "traxle" transmission to the rear end of the propeller shaft;

FIGURE 5 shows the mount for the "traxle" transmission unit;

FIGURE 6 is a cross-sectional view of the rear end portion of the engine showing the connection of the forward end of the propeller shaft thereto; and FIGURE 7 is a partial cross-sectional view of a variation of the propeller shaft mounting at a point spaced along the vehicle frame.

Referring to the drawings, and in particular to FIGURE 1, a vehicle frame, generally designated 10, supports an engine 12 at its forward end and a "traxle" unit or combination transmission-differential gear unit 14 at its rear end. The propeller shaft 16 that drivingly interconnects the engine 12 and "traxle" unit 14 embodies this invention.

The connections of the shaft 16 to the engine and the "traxle" unit are made in line with the rotational axis "A" and "B" respectively of the engine and "traxle" and since the engine and "traxle" are tilted toward each other the shaft 16 is bowed downwardly. With this new type of shaft the floor level indicated by dotted line 19 may be dropped considerably below the former floor levels necessitated by the non-flexible propeller shafts now in general use.

Interconnecting the output end of the engine 12 and the input end of the "traxle" 14 is the propeller shaft 16 that is covered by a flexible plastic sheath 18 of nylon or other plastic or similar material having resiliency and good weathering and/or bearing characteristics.

As shown in FIGURE 1, the sheath 18 may be supported at three different points along the length of the shaft 16 by brackets 20, 22, and 24. These brackets, as shown in FIGURES 2 and 3, consist of a plate-like body 26 having adjusting slots 28 therein and an integral flange 30 adjacent the upper portion thereof. A compression flange 32 may be bolted to flange 30 by bolts 34 to compress between said flanges a sleeve of resilient plastic material 36 such as sponge rubber, polyurethane foam, or the like to thereby provide a resilient bearing support for the shaft encasing plastic sleeve 18 and the shaft 16. Bolts 29 inserted through slots 28 in brackets 20, 22, and 24, and through apertures 31 in the frame cross arms 38 and secured thereto by nuts 33 to provide a means for adjusting the height of the brackets 20, 22, and 24 and bearing supports 36 with respect to the vehicle floor.

It is noted that the compression flange 32 may be tightened to flange 30 to such an extent that the nylon or other plastic sleeve 18 could be held stationary to the resilient material 36 so that the steel shaft 16 would rotate inside of the sleeve 18. It has been found, however, that a bearing means for the shaft 16 can be provided by allowing the sleeve 18 to rotate with the shaft 16 and by providing a frame mounted ball bearing type of bearing 40, as shown in FIGURE 7. Bearing 40 has its inner race 42 frictionally secured to sleeve 18 by split collar 43 and has its outer race 45 frictionally secured to support 44. It is noted that in the bearing of FIGURE 7 the support 44 is resiliently secured through resilient rubber means 46 to a slotted bracket 48 which may be adjustably secured to the frame cross arms 38 in a manner similar to brackets 20, 22, and 24.

Referring to FIGURES 4 and 6, respectively, it is seen that the shaft 16 has its rear end portion secured to the input end 50 of the "traxle" 14 by means of a tapered split collar 52 and cooperating nut 54, and the front end of shaft 16 is secured to the ring gear 56 on the output end of the engine 12 by split collar 58 and nut 60. The particular type of attachment means used to connect the opposite ends of the shaft 16 to the engine 12 and the "traxle" or differential 14 may be varied without materially affecting the invention.

I claim:

In a motor vehicle, a support structure, a vehicle power plant attached to said support structure in the front of said vehicle and having an output shaft extending rearwardly therefrom, a drive transmission differential unit attached to said support structure at the rear of said vehicle and having an input shaft extending forwardly therefrom, said input and output shafts being longitudinally aligned and each inclined downwardly at a fixed predetermined angle with respect to said vehicle, a single, one-piece, solid, flexible shaft having one end axially aligned with and drivingly connected to said output shaft and its other end axially aligned with and drivingly connected to said input shaft, a plurality of spaced, resiliently supported, bearing means located intermediate the end portions of said solid shaft between the power plant and the drive transmission differential unit for damping vibrations of said shaft and applying a predetermined bending moment to said solid shaft to hold the same in a predetermined, downwardly bowed, shape during transmission of drive from said power plant to said axle assembly by said solid shaft, said bearing means applying a bending stress to said shaft less than the elastic limit of the same including a separate, plastic sheath contiguously encasing said shaft from substantially end to end and permitting relative rotation between the shaft and sheath, and resilient mounting means for said sheath connecting spaced portions of said sheath to said support structure comprising axially spaced sleeves of resilient plastic material surrounding said sheath and fixedly connected thereto so that said shaft is journalled in bearing relation in said sheath, and rigid bracket means connecting said resilient sleeves to said support structure to maintain the predetermined downwardly bowed shape of said shaft during drive transmission thereby.

References Cited by the Examiner

UNITED STATES PATENTS

| | | | |
|---|---|---|---|
| 1,897,542 | 2/33 | West | 180—70 X |
| 2,001,167 | 5/35 | Swennes | 180—70 X |
| 2,142,497 | 1/39 | Clendenin | 64—2 |
| 2,168,108 | 8/39 | Bunau-Varilla | 180—70 X |
| 2,195,647 | 4/40 | Guy | 180—70 |
| 2,240,317 | 4/41 | Swenson | 180—73 |
| 2,963,106 | 12/60 | Sampietro | 180—70 |
| 3,037,573 | 6/62 | Larsen | 180—70 |

OTHER REFERENCES

Text: "Introduction to a Study of Mechanical Vibrations," by G. W. Van Santen; distributed by Elsevier Press Inc., 402 Lovett Blvd., Houston 6, Texas.

A. HARRY LEVY, *Primary Examiner.*

WILLIAM J. KANOF, PHILIP ARNOLD, *Examiners.*